(12) United States Patent
Sun et al.

(10) Patent No.: US 8,481,192 B2
(45) Date of Patent: *Jul. 9, 2013

(54) REDOX FLOW BATTERY

(75) Inventors: Hee-young Sun, Yongin-si (KR);
Joung-won Park, Seongnam-si (KR);
Seung-sik Hwang, Seongnam-si (KR);
Doo-yeon Lee, Yongin-si (KR);
Myung-jin Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 324 days.

This patent is subject to a terminal disclaimer.

(21) Appl. No.: 12/828,551

(22) Filed: Jul. 1, 2010

(65) Prior Publication Data
US 2011/0189549 A1 Aug. 4, 2011

(30) Foreign Application Priority Data
Jan. 29, 2010 (KR) .................. 10-2010-0008596

(51) Int. Cl.
*H01M 8/20* (2006.01)

(52) U.S. Cl.
USPC .......................... 429/105; 429/107; 429/108

(58) Field of Classification Search
USPC ........................................ 429/105, 107, 108
See application file for complete search history.

(56) References Cited

U.S. PATENT DOCUMENTS

| | | | |
|---|---|---|---|
| 4,382,116 A | 5/1983 | Gahn et al. | |
| 4,591,453 A | 5/1986 | Kobayashi | |
| 4,857,423 A * | 8/1989 | Abraham et al. | 429/329 |
| 7,252,905 B2 * | 8/2007 | Clarke et al. | 429/105 |
| 2006/0063065 A1 | 3/2006 | Clarke et al. | |
| 2011/0195283 A1 * | 8/2011 | Sun et al. | 429/107 X |
| 2012/0107661 A1 * | 5/2012 | Lee et al. | 429/107 |

FOREIGN PATENT DOCUMENTS
JP 1987-015770 1/1987

OTHER PUBLICATIONS
U.S. Appl. No. 12/828,537, filed Jul. 1, 2010, Hee-Young Sun et al., Samsung Electronics Co., Ltd.

* cited by examiner

*Primary Examiner* — Stephen J. Kalafut
(74) *Attorney, Agent, or Firm* — Cantor Colburn LLP

(57) ABSTRACT

A redox flow battery has a high energy density and an excellent charge and discharge efficiency because re-precipitation is prevented in an electrolyte solution or eduction is prevented in an electrode during reduction of a metal ion used as an electrolyte.

12 Claims, 5 Drawing Sheets

REDOX FLOW BATTERY

CROSS-REFERENCE TO RELATED APPLICATION

This application claims the benefit of Korean Patent Application No. 10-2010-0008596, filed Jan. 29, 2010 in the Korean Intellectual Property Office, the disclosure of which is incorporated herein in its entirety by reference.

BACKGROUND

1. Field

Aspects of the present disclosure relate to redox flow batteries, and more particularly, to redox flow batteries having high energy density and high charge and discharge efficiency.

2. Description of the Related Art

Secondary batteries are highly efficient energy storage systems widely used for small mobile phones and middle and large power storage devices. Specifically, secondary batteries are used as main core parts in semiconductor and liquid crystal devices, acoustic devices, and information and communication devices (such as mobile phones and laptops). More recently, they started to be used as power sources in hybrid cars.

Such power storage systems require a stable energy supply and a high energy conversion efficiency. Recently, redox flow batteries have come into the spotlight as secondary batteries having a large capacity and high durability, which are most suitable for large power storage systems.

Unlike other batteries, an active material of the redox flow batteries exists as ions in an aqueous state instead of a solid state, and the redox flow batteries use a mechanism of storing and generating electric energy according to oxidation/reduction reaction of each ion in a cathode and an anode.

In other words, the redox flow batteries include an electrolyte solution, wherein an active material of an electrode is dissolved in a solvent. The cathode is oxidized and the anode is reduced when the redox flow battery including a catholyte and an anolyte having different oxidation numbers is charged, and the electromotive force of the redox flow battery is determined by a difference between standard electrode potentials (E0) of a redox couple forming the catholyte and the anolyte. Meanwhile, the catholyte and anolyte are supplied from respective electrolyte solution tanks by a pump. The redox flow batteries simultaneously have a quick reaction rate during oxidation and reduction on the surfaces of the cathodes and anodes like general batteries, and have large capacity like fuel cells.

SUMMARY

Aspects of the present invention include redox flow batteries having large energy density and high energy efficiency.

According to an aspect of the present invention, a redox flow battery includes: a catholyte; an anolyte; and an anion exchange membrane disposed between the catholyte and the anolyte, wherein at least one of the catholyte and the anolyte is an organic electrolyte solution including a non-aqueous solvent, a support electrolyte, and a metal-ligand coordination compound, wherein the metal-ligand coordination compound is dissolved in an electrolyte solution while the metal-ligand coordination compound is in an atom state with zero oxidation.

According to an aspect of the invention, a metal in the metal-ligand coordination compound may be at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), and copper (Cu).

According to an aspect of the invention, a ligand in the metal-ligand coordination compound may be at least one selected from the group consisting of dipyridyl, terpyridyl, ethylene diamine, propylene diamine, phenanthroline, and 2,6-bis(methyl imidazole-2-ylidene)pyridine.

According to an aspect of the invention, at least two electrons of the metal-ligand coordination compound may transfer during oxidation-reduction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
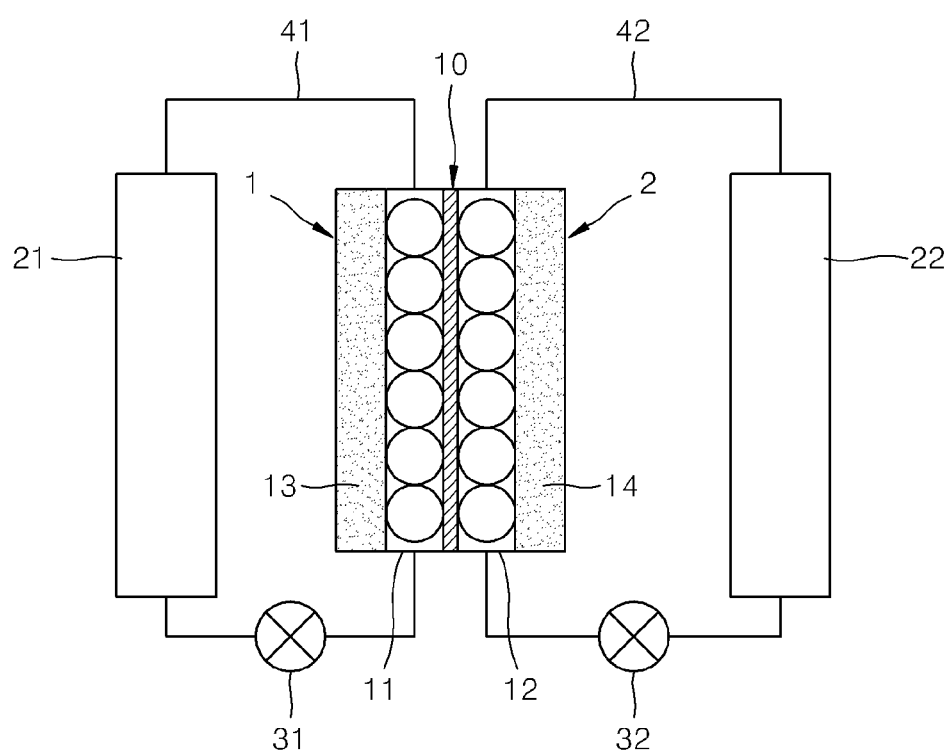
FIG. 1 is a diagram schematically illustrating a redox flow battery according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram schematically illustrating a general redox flow battery according to an aspect of the invention. As shown in FIG. 1, the redox flow battery includes a cathode cell 1 and an anode cell 2, which are divided by an ion exchange membrane 10. The cathode cell 1 includes a cathode 13 and the anode cell 2 includes an anode 14. The cathode cell 1 is connected to a cathode tank 21 for providing and discharging a catholyte 11 through a pipe 41. Similarly, the anode cell 2 is connected to an anode tank 22 for supplying and discharging an anolyte 12 through a pipe 42. The catholyte and anolyte 11 and 12 respectively circulate through pumps 31 and 32. Charging and discharging occur in the cathode 13 and the anode 14 according to a change of oxidation numbers of ions.

The ion exchange membrane 10 prevents ions of active materials of the catholyte 11 and the anolyte 12 from being mixed with each other, and permits only ions of a charge carrier of a supporting electrolyte to be transferred.

The redox flow battery according to an embodiment of the present invention includes the catholyte 11 and/or the anolyte 12 includes an organic electrolyte solution including a non-aqueous solvent, a support electrolyte, and a metal-ligand coordination compound. The metal-ligand coordination compound is dissolved in an electrolyte solution while the metal-ligand coordination compound is in an atom state with zero oxidation.

The redox flow battery is discharged by connecting it to an external circuit including an electric load (not shown) and supplying a current to the external circuit. The redox flow battery is charged by connecting it to an external power source (not shown) and supplying a current to the redox flow battery.

Generally, the catholyte 11 is charged when a redox couple is oxidized to a higher one of two oxidation states, and is discharged when reduced to a lower one of the two oxidation state. In contrast, the anolyte 12 is charged when a redox couple is reduced to a lower one of two oxidation states, and is discharged when oxidized to a higher one of the two oxidation states.

Cathode $$C^n \rightarrow C^{n-y} + ye^- \text{ (Charge)}$$

$$C^{n-y} + ye^- \rightarrow C^n \text{ (Discharge)}$$

(C: Catholyte)

Anode $$A^{n-x} + xe^- \rightarrow A^n \text{ (Charge)}$$

$$A^n \rightarrow A^{n-x} + xe^- \text{ (Discharge)}$$

(A: Anolyte)

Since a working potential of a general redox flow battery using an aqueous solvent is limited to a water-decomposition potential area, the general redox flow battery has a low operating voltage, and thus has low energy density. Accordingly, a non-aqueous solvent may be used. However, a conventional electrolyte has low solubility with respect to the non-aqueous solvent and may be educed while a metal ion is reduced. Thus, the desired energy density may not be obtained, and a cell life may be decreased since charge and discharge irreversible capacity is accumulated as the number of cycles is increased.

Accordingly, the organic electrolyte solution according to the current embodiment of the present invention includes the metal-ligand coordination compound that is stable in the electrolyte solution while it is in a zero oxidation state. This means that the metal-ligand coordination compound in a zero oxidation state is dissolved in a solvent, such as a non-aqueous solvent, without being precipitated or educed.

A metal stable in the electrolyte solution with zero oxidation may be at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), and copper (Cu). In particular, the metal may be Ni.

A ligand in the metal-ligand coordination compound may be at least one type selected from the group consisting of dipyridyl, terpyridyl, ethylene diamine, propylene diamine, phenanthroline, and 2,6-bis(methyl imidazole-2-ylidene)pyridine.

In the metal-ligand coordination compound, at least two electrons may be transferred during oxidation-reduction. Examples of the metal-ligand coordination compound may include:

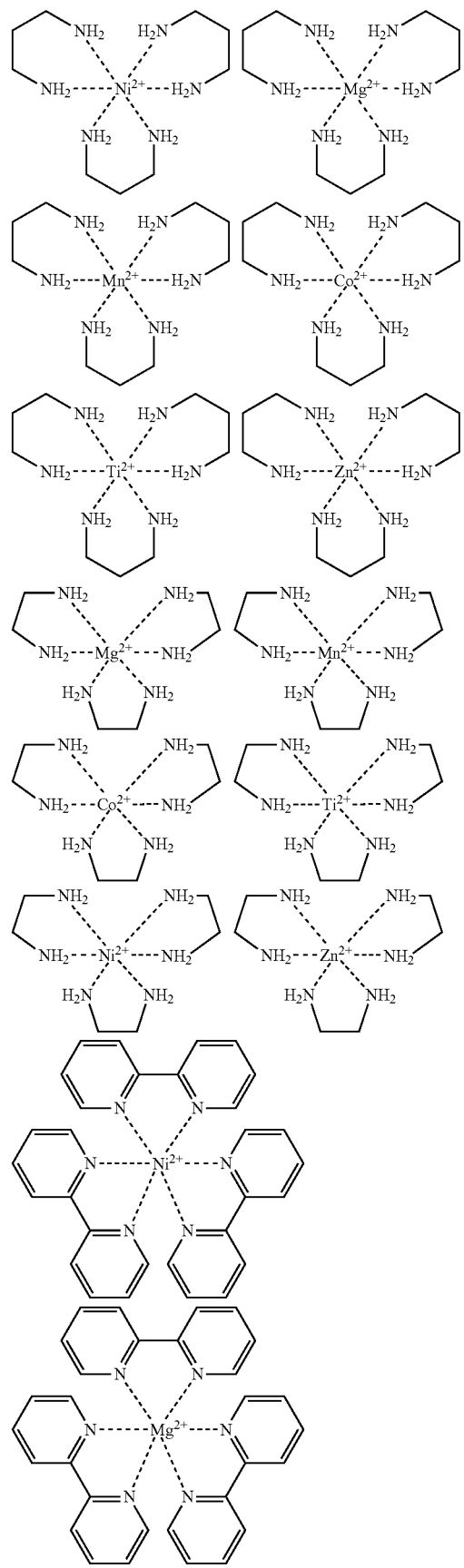

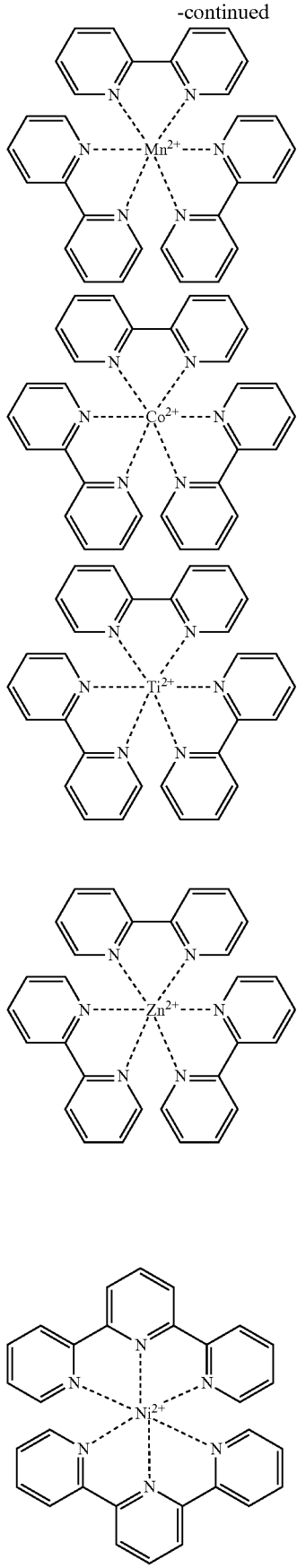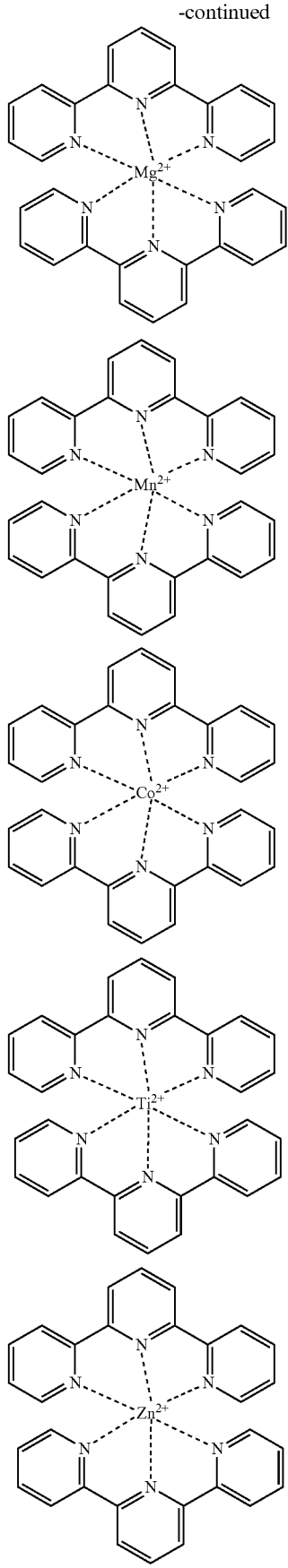

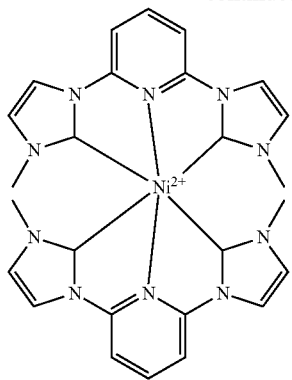
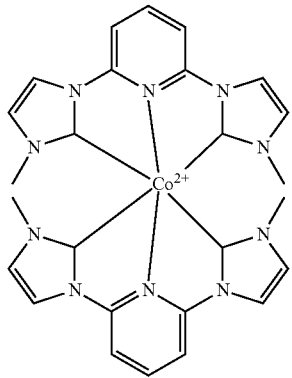
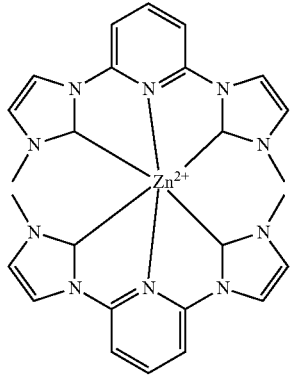
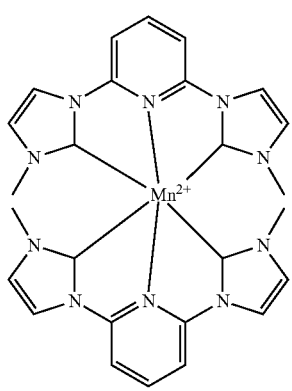
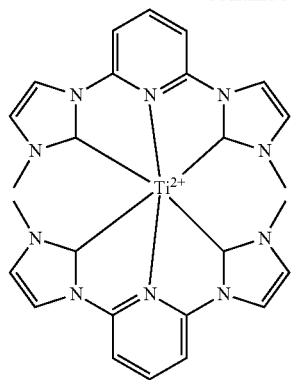
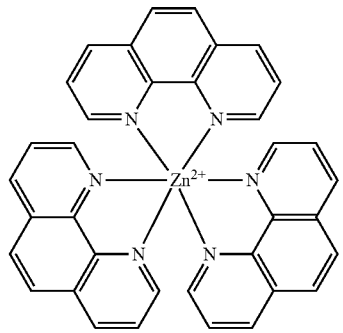
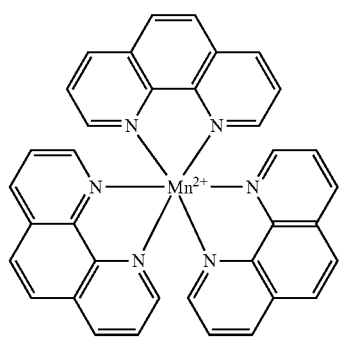
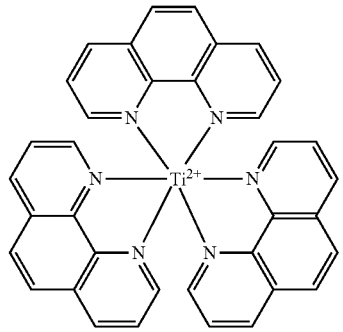
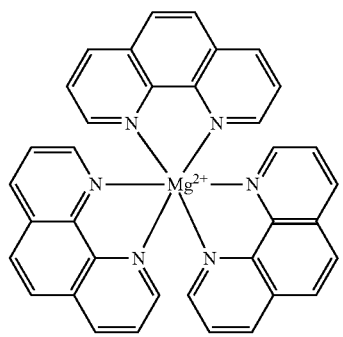

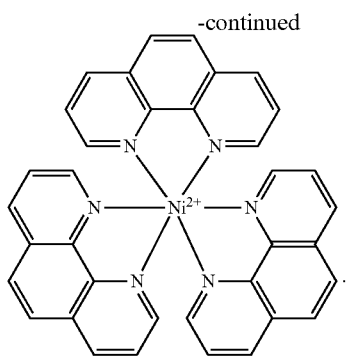

A counter anion of the metal-ligand coordination compound may be $BF_4^-$, $PF_6^-$, $CF_3SO_3^-$, or $(CF_3SO_2)_2N^-$.

Examples of the non-aqueous solvent include dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

According to an embodiment of the present invention, one of the catholyte 11 and the anolyte 12 may be an organic electrolyte solution including an electrolyte formed of a metal-ligand coordination compound that is stable in an electrolyte solution while the metal-ligand coordination compound has zero oxidation. In other words, when one of the catholyte 11 and the anolyte 12 includes the electrolyte formed of the metal-ligand coordination compound that is stable in the electrolyte solution while the metal-ligand coordination compound has zero oxidation, the other may include any well known electrolyte.

According to an embodiment of the present invention, at least one of the catholyte 11 and the anolyte 12 may include the metal-ligand coordination compound, wherein at least two electrons transfer during oxidation-reduction.

The catholyte 11 and the anolyte 12 may include a redox couple of $Fe^{2+}/Ni^0$, $R^{2+}/Ni^0$, $R^{2+}/Co^0$, or $Fe^{2+}/Co^0$.

While not required in all aspects, the shown redox flow battery 1 includes the cathode cell 1 including the cathode 13, the anode cell 2 including the anode 14, and the catholyte tank 21 and the anolyte tank 22 respectively connected to the cathode cell 1 and the anode cell 2 to transfer fluid.

The ion exchange membrane 10 prevents the catholyte 11 and the anolyte 12 from being mixed with each other. The ion exchange membrane 10 can be an anion exchange membrane which uses the counter anion of the metal-ligand coordination compound as a charge carrier, obtains a sufficient amount of charge carrier by using a small amount of support electrolyte, and obtains high charge and discharge efficiency and high voltage efficiency by suppressing movement of a cation as an active material.

When a conventional cation exchange membrane is used as the ion exchange membrane 10, a salt of a cation such as $Na^+$, $Li^+$, or $H^+$ is used as a source of a charge carrier, but solubility of the salt is low in an organic solvent. When a small amount of water is added to increase the solubility, the ligand in the metal-ligand coordination compound becomes unstable, and thus an oxidization/reduction reaction is not completely reversible. However, when the anion exchange membrane is used as the ion exchange membrane 10, a salt having high solubility in an organic solvent may be used, and thus water may be completely removed. Accordingly, the ligand in the metal-ligand coordination compound may be prevented from being decomposed, and an oxidation/reduction reaction of the metal-ligand coordination compound may be reversible. Thus, cycle efficiency and voltage efficiency increase.

The anion exchange membrane may be an anion exchange membrane that is obtained by aminating a copolymer of styrene-divinylbenzene used as a base by introducing a chloromethyl group, an anion exchange membrane that is obtained by substituting a copolymer of vinylpyridine-divinylbenzene with quaternary pyridium, or an anion exchange membrane obtained by aminating an aromatic polysulfone copolymer used as a base by introducing a chloromethyl group.

Examples of a commercial anion exchange membrane include NEOSEPTA-AMEX, NEOSEPTA-AHA, and NEOSEPTA-ACS manufactured by ASTOM, Cybron ionan MA3475 manufactured by LANXESS, FAS, FAB, FAN, FAA, and FAD manufactured by FuMa-atech, and PC100D, PC200D, and PC-SA manufactured by Polymerchemie Altmeier (PCA).

The supporting electrolyte has a charge balance function that maintains a charge balance between the catholyte and the anolyte without directly participating in a reaction.

The supporting electrolyte may be at least one type selected from the group consisting of $LiBF_4$, $LiPF_6$, $LiClO_4$, $LiCF_3SO_3$, $Li(CF_3SO_2)_2N$, triethylamine tetrafluorborate ($TEABF_4$), and tributhylamine tetrafluorborate ($TBABF_4$). When the supporting electrolyte is used instead of a general sulfuric acid, an electrolyte solution may be prepared by using a non-aqueous solvent.

The redox flow battery is not only suitable for a mobile phone or a portable computer, but also for an electric vehicle that requires a high capacity and large power, and may also be used for a hybrid vehicle by being connected to a general internal combustion engine, a fuel cell, or a super capacitor. In addition, the redox flow battery may be used for other devices that require a large power and high voltage, such as for industrial power storage and storage of power produced through green power sources (such as solar or wind power sources) for later use or sale. However, the invention is not limited thereto.

Aspects of the present invention will be described in greater detail with reference to the following examples. The following examples are for illustrative purposes only and are not intended to limit the scope of the invention.

Preparation Example 1

Preparation of $Ni^{2+}$-(phenanthroline)$_3$[$BF_4$]$_2$ 2.692 g of $NiSO_4.6H_2O$ and 30 ml of methanol were put into a 100 ml round-bottom flask, and were stirred for 5 to 20 minutes to obtain a $NiSO_4.6H_2O$ solution. 5.767 g of phenanthroline (phen) and 60 ml of methanol were put into a separate 50 ml round-bottom flask, and were stirred for 5 to 10 minutes to obtain a phenanthroline solution. The phenanthroline solution was slowly added to the $NiSO_4.6H_2O$ solution and then was stirred until the color of a mixed solution changed from dark blue to purple to pink. Then, 5.490 g of $NaBF_4$ was added to the pink mixed solution, and then stirred for at least 30 minutes. Next, the result product was filtered, washed with water and methanol several times, and then dried in vacuum so as to obtain 3.456 g of $Ni^{2+}$-(phenanthroline)$_3$[$BF_4$]$_2$.

Preparation Example 2

Preparation of $Fe^{2+}$-(phenanthroline)$_3$[$BF_4$]$_2$ 7.15 g of $Fe^{2+}$-(phenanthroline)$_3$[$BF_4$]$_2$ was obtained in the same manner as in Preparation Example 1, except that 1.52 g of $FeSO_4.7H_2O$ was used instead of 2.692 g of $NiSO_4.6H_2O$.

Example 1

Charging was performed by using 0.6 M Fe(Phen)$_3$(BF$_4$)$_2$ dissolved in 5 ml of GBL as a catholyte and 0.3 M Ni(Phen)$_3$BF$_4$ dissolved in 5 ml of GBL as an anolyte. 0.5 M TEABF$_4$ was dissolved in each of the catholyte and the anolyte as a support electrolyte.

A carbon felt electrode was prepared by thermal-processing carbon felt (Nippon Graphite, GF20-3, t=3 mm, A=5×5 cm$^2$) for 5 hours at 500° C. under an air atmosphere, and a non-flow type battery was prepared as follows. "NEO-SEPTA" AMX manufactured by Astom was used as an anion exchange membrane.

An insulator, a current collector, and a bipolar plate were stacked on a nut-integrated end plate in the stated order. The 5×5 cm$^2$ square carbon felt electrode was cut into halves to obtain two rectangular carbon felt electrodes, and the rectangular carbon felt electrodes were inserted into a concave portion of each of two of the bipolar plates stacked as above.

3 ml of each of the catholyte and anolyte prepared above were respectively injected into the positive carbon felt electrode and the negative carbon felt electrode prepared according to the above method, and then the positive and negative carbon felt electrodes were assembled. A bolt inserted into a disk spring was tightened in a diagonal order up to 1.5 Nm by using a torque wrench. Next, the remaining catholyte and anolyte were injected into a respective injection hole of each of the positive and negative carbon felt electrodes, and then the injection hole was closed with a Teflon bolt. The Teflon bolt having a gas leak hole was used for each bipolar plate.

Example 2

A redox flow battery was prepared in the same manner as in Example 1, except that PC-SA manufactured by PCA was used as an anion exchange membrane instead of "NEO-SEPTA" AMX.

Comparative Example 1

A catholyte and an anolyte were respectively prepared by preparing 1 M V$^{2+}$ and V$^{5+}$ solutions respectively from aqueous solutions having compositions of 1M VOSO$_4$ (Aldrich, 97% hydrate) and 2M H$_2$SO$_4$ (Aldrich 96% solution). Carbon felt (Nippon Graphite, GF20-3, t=3 mm, A=5×5 cm$^2$) was used as an electrode, and Nafion 117 substituted with a hydrogen ion was used as a cation exchange membrane. A method and an order of assembling an all vanadium redox flow battery were identical to those described with respect to Example 1.

Charge and Discharge Evaluation (Non-Flow Type Battery)

A charge and discharge test was performed on the batteries prepared according to Examples 1 and 2 and Comparative Example 1, at the room temperature of about 25° C. Each battery was charged up to 2.6 V with a constant current of 10 mA, and was discharged up to 0.8 V with a constant current of 5 mA. Such charging and discharging were repeated 6 times.

Figure 2:
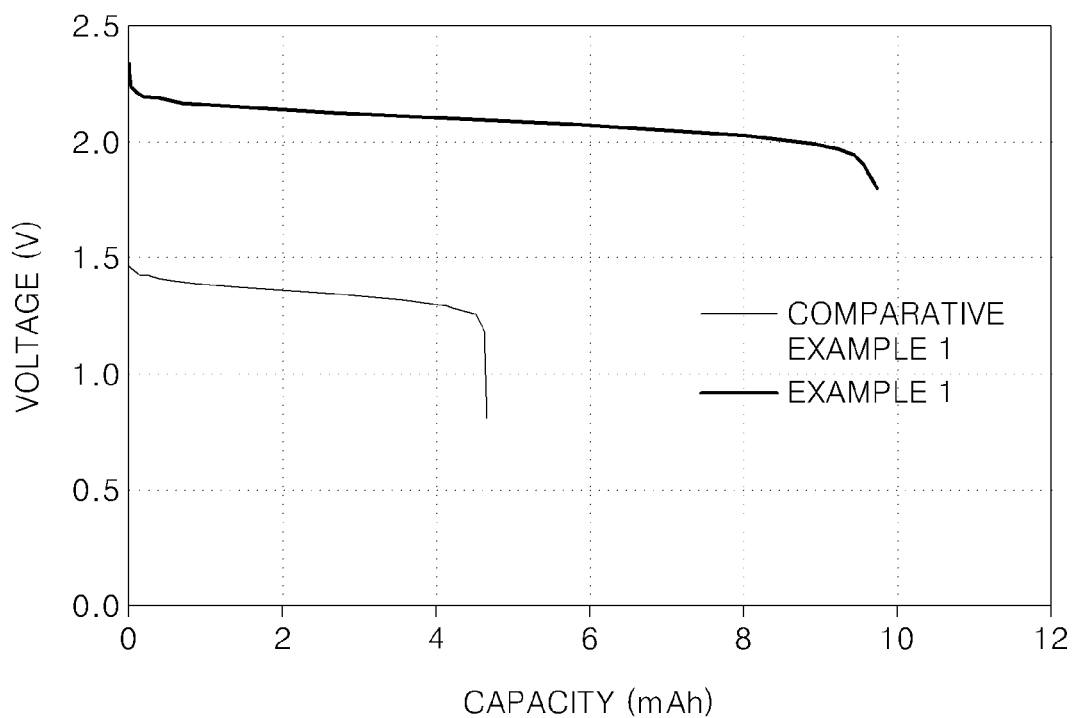
FIG. 2 is a graph showing discharge curves of batteries according to Example 1 and Comparative Example 1.
Figure 3:
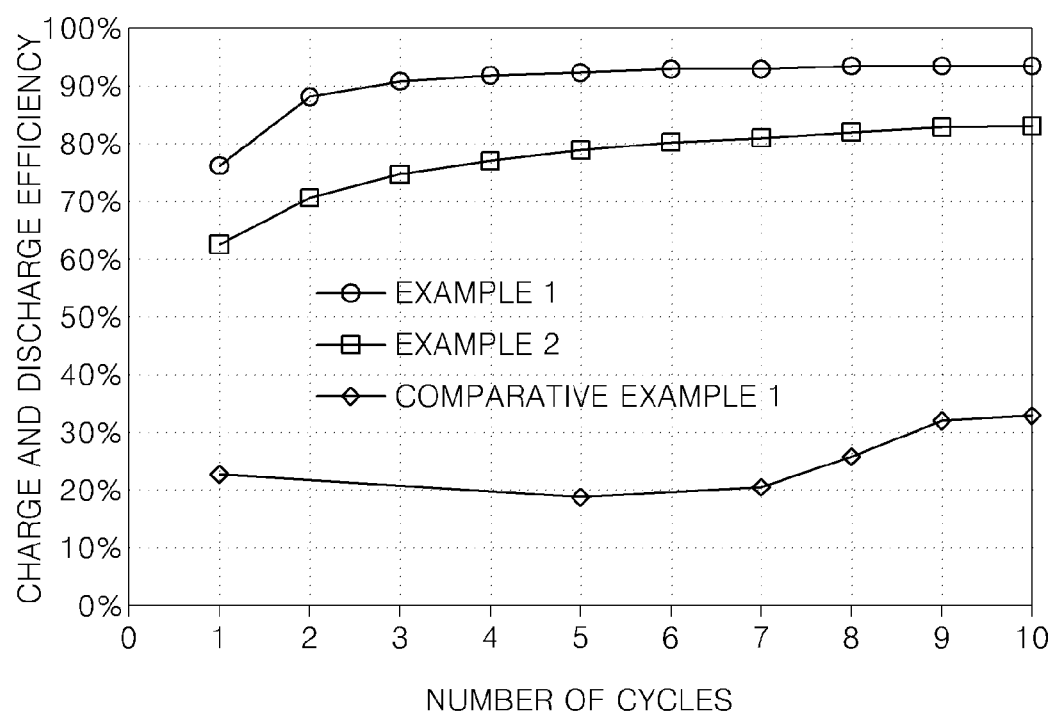
FIG. 3 is a graph showing charge and discharge efficiencies of the batteries of Examples 1 and 2, and Comparative Example 1.
Figure 4:
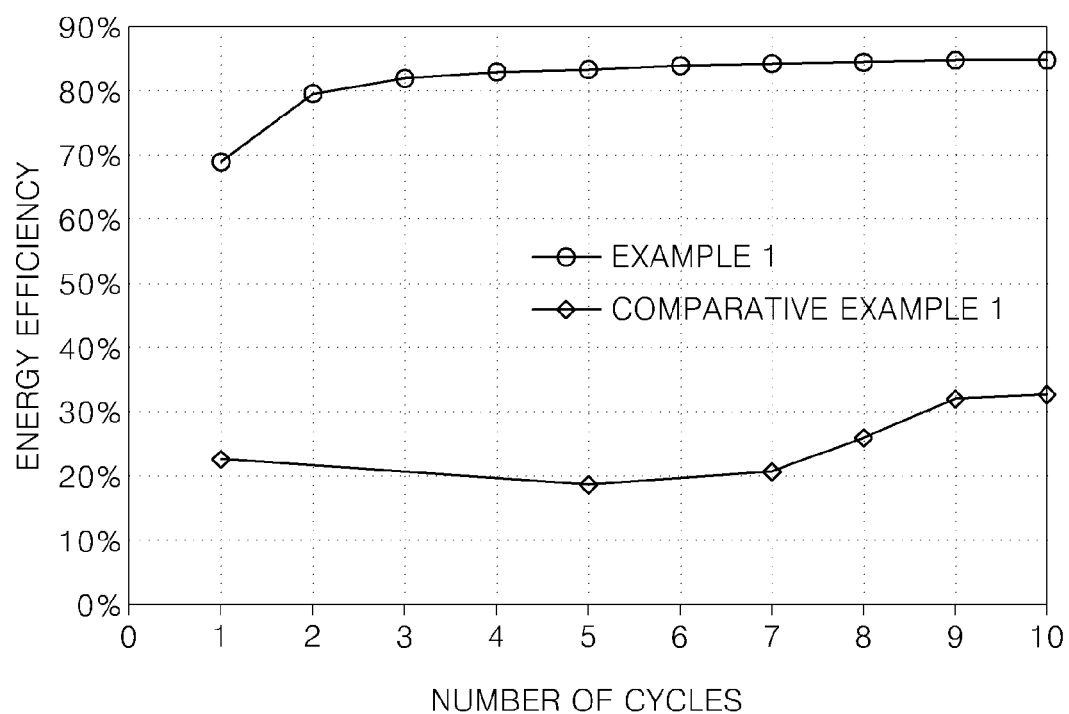
FIG. 4 is a graph showing energy efficiencies of the batteries of Example 1 and Comparative Example 1.

In regards to FIGS. 3 and 4, energy efficiency is shown as a value obtained by multiplying voltage efficiency and charge and discharge efficiency, the voltage efficiency is shown as a percentage obtained by dividing an average discharge voltage by an average charge voltage, and charge and discharge efficiency is shown as a percentage obtained by dividing amount of discharge by amount of charge, The results of the charge and discharge test are shown in FIG. 2. FIG. 2 is a graph showing discharge curves of the batteries according to Example 1 and Comparative Example 1. As shown in FIG. 2, a current size of the battery of Example 1 was adjusted to be ½ of a current size of the battery of Comparative Example 1 due to high cell internal resistance while performing the charge and discharge test. Upon measuring a cell resistance by using an alternating current impedance method, a solution resistance of the battery of Example 1 was about 50 times larger than that of the battery of Comparative Example 1, with 5Ω. As shown in FIG. 2, the battery of Example 1 had a high open-circuit voltage of 2.34 V compared to 1.5 V of the vanadium redox flow battery of Comparative Example 1, and had a high average discharge voltage of 2.1 V. Moreover, the amount of discharge was 2 times higher than the vanadium redox flow battery of Comparative Example 1, despite the fact that the battery of Example 1 used about 60% of active material concentration of the vanadium redox flow battery of Comparative Example 1.

FIG. 3 is a graph showing charge and discharge efficiencies of the batteries of Examples 1 and 2, and Comparative Example 1. As shown in FIG. 3, the charge and discharge efficiency of the battery of Example 1 was 90.4% in average and the charge and discharge efficiency of the battery of Example 2 was 89.3% in average. The charge and discharge efficiencies of Examples 1 and 2 are at least 3 times higher than the charge and discharge efficiency of the battery of Comparative Example 1 (i.e., 25.4% in average).

FIG. 4 is a graph showing energy efficiencies of the batteries of Example 1 and Comparative Example 1 measured at each cycle. As shown in FIG. 4, a charge and discharge current of the battery of Example 1 was smaller than that of the battery of Comparative Example 1 due to high membrane resistance. However, for 10 cycles, the average energy efficiency was 81.6%. This energy efficiency is 3 times higher than the average energy efficiency for the battery of Comparative Example 1 (i.e., 25.1%).

Figure 5:
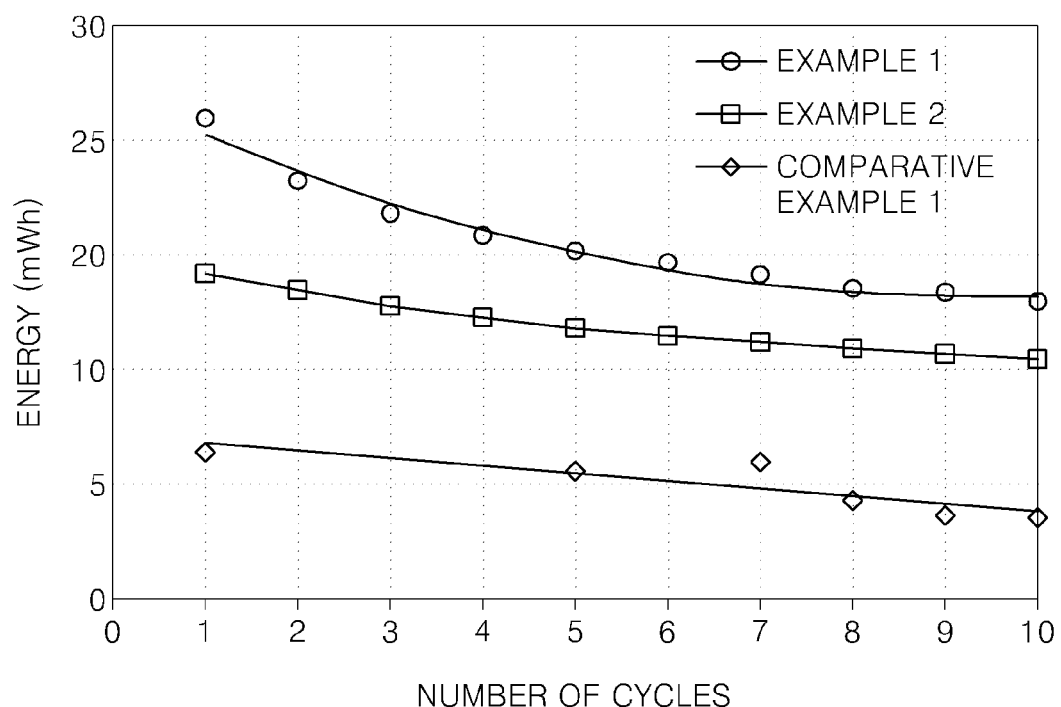
FIG. 5 is a graph showing energy amounts of the batteries of Example 1 and Comparative Example 1.

FIG. 5 is a graph showing energy amounts of the batteries of Example 1 and Comparative Example 1. Here, an energy amount (mWh) may be obtained by multiplying a voltage (V) to discharge capacity (mAh). As shown in FIG. 5, the battery of Example 1 provides an energy amount 3 times higher than the battery of Comparative Example 1, despite the fact that the battery of Example 1 used about 60% of active material concentration of the battery of Comparative Example 1.

As described above, according to the one or more of the above embodiments of the present invention, a redox flow battery having high energy density and excellent energy efficiency is obtained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A redox flow battery comprising:
  a catholyte;
  an anolyte; and
  an anion exchange membrane disposed between the catholyte and the anolyte,
  wherein:
    at least one of the catholyte and the anolyte comprises an organic electrolyte solution comprising a non-aqueous solvent, a supporting electrolyte, and a metal-ligand coordination compound, and
    the metal-ligand coordination compound, comprising a metal and a neutral ligand, is dissolved in an electrolyte solution while the metal-ligand coordination compound is in a zero oxidation state, without being precipitated or educed.

2. The redox flow battery of claim 1, wherein a metal in the metal-ligand coordination compound is at least one type selected from the group consisting of nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), and copper (Cu).

3. The redox flow battery of claim 1, wherein a ligand in the metal-ligand coordination compound is at least one selected from the group consisting of dipyridyl, terpyridyl, ethylene diamine, propylene diamine, phenanthroline, and 2,6-bis(methyl imidazole-2-ylidene)pyridine.

4. The redox flow battery of claim 1, wherein at least two electrons of the metal-ligand coordination compound transfer during oxidation-reduction.

5. The redox flow battery of claim 1, wherein the metal-ligand coordination compound is at least one compound selected from the group consisting of:

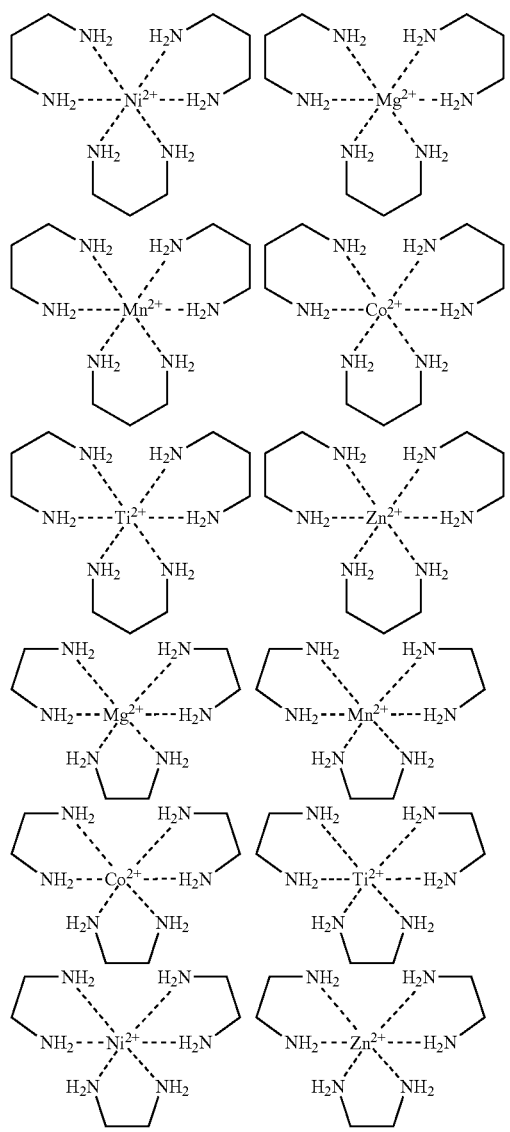

-continued

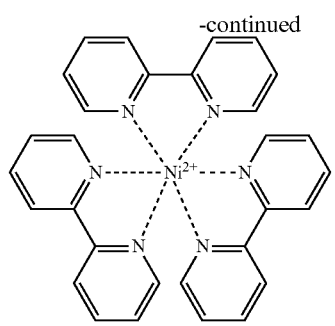

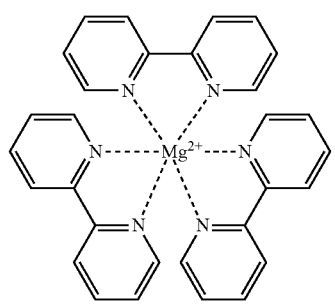

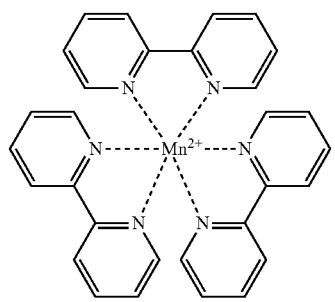

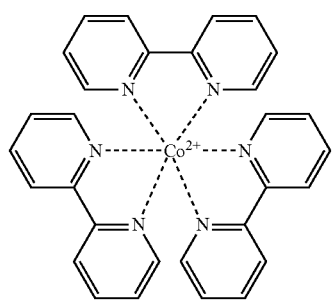

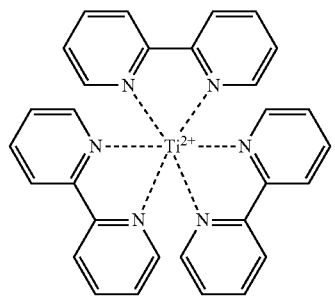

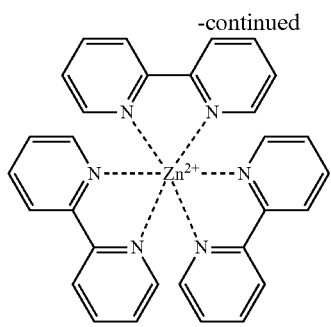
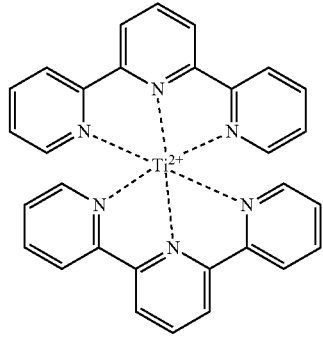
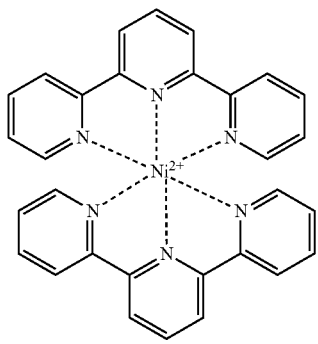
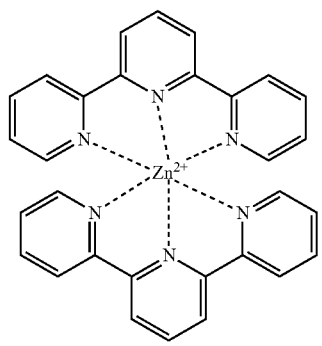
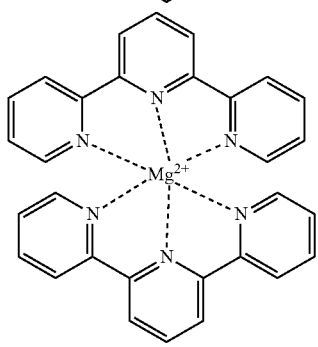
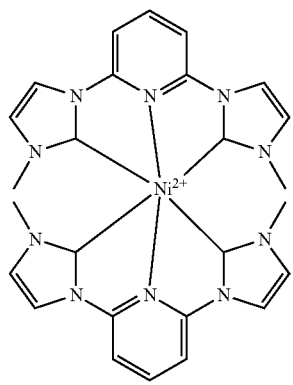
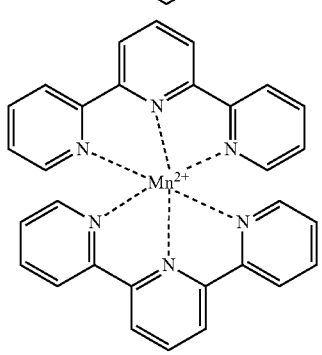
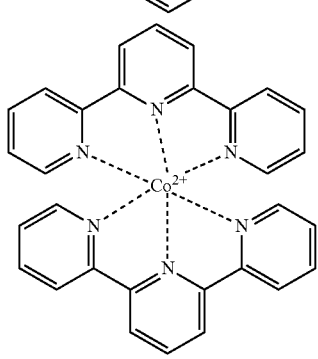
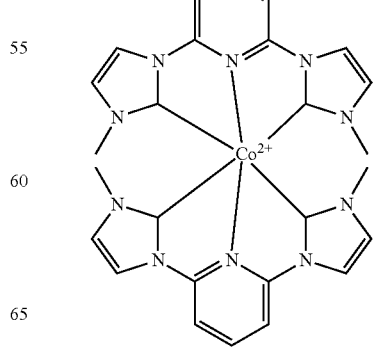

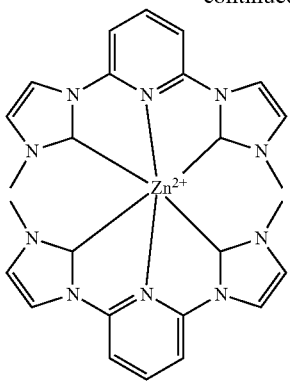

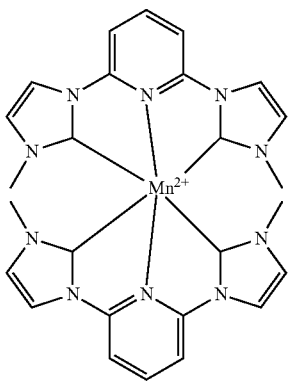

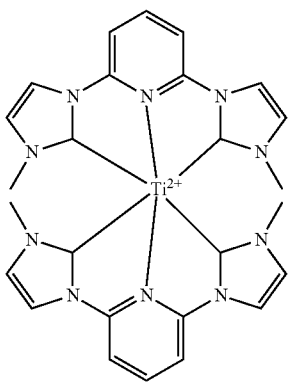

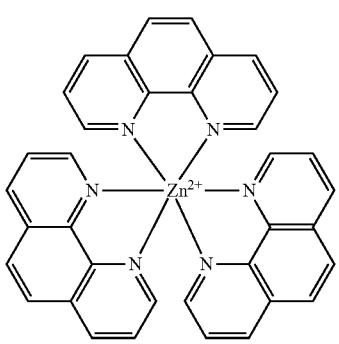

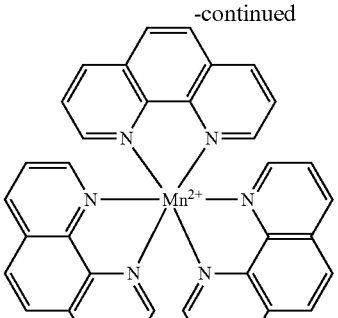

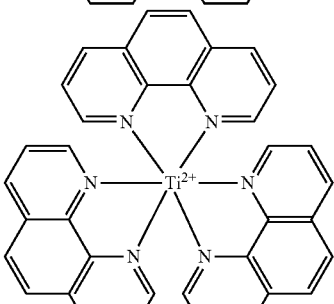

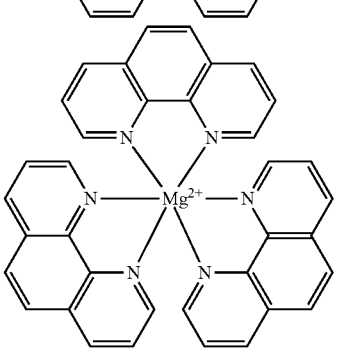

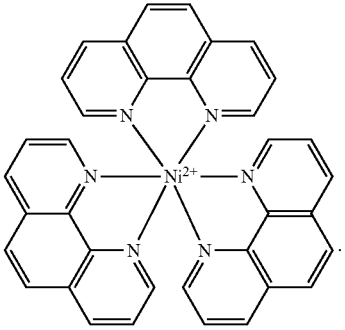

6. The redox flow battery of claim 1, wherein a counter anion of the metal-ligand coordination compound comprises $BF_4^-$, $PF_6^-$, $CF_3SO_3^-$, or $(CF_3SO_2)_2N^-$.

7. The redox flow battery of claim 1, wherein the support electrolyte is at least one type selected from the group consisting of $LiBF_4$, $LiPF_6$, $LiClO_4$, $LiCF_3SO_3$, $Li(CF_3SO_2)_2N$, triethylamine tetrafluorborate ($TEABF_4$), and tributhylamine tetrafluoroborate ($TBABF_4$).

8. The redox flow battery of claim 1, wherein the anion exchange membrane is an anion exchange membrane that is obtained by aminating a copolymer of styrene-divinylbenzene used as a base by introducing a chloromethyl group, an anion exchange membrane that is obtained by substituting a copolymer of vinylpyridine-divinylbenzene with quaternary pyridium, or an anion exchange membrane obtained by aminating an aromatic polysulfone copolymer used as a base by introducing a chloromethyl group.

9. The redox flow battery of claim 1, wherein the catholyte and the anolyte comprise a redox couple for transferring at least two electrons.

10. The redox flow battery of claim 9, wherein the redox couple is $Fe^{2+}/Ni^0$, $Ru^{2+}/Ni^0$, $Ru^{2+}/Co^0$, or $Fe^{2+}/Co^0$.

11. The redox flow battery of claim 1, wherein the non-aqueous solvent is at least one type selected from the group consisting of dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

12. The redox flow battery of claim 1, further comprising:
a cathode cell comprising a cathode;
an anode cell comprising an anode;
a catholyte tank connected to the cathode cell to transfer a fluid; and
an anolyte tank respectively connected to the anode cell to transfer another fluid.

* * * * *